Nov. 17, 1959   A. W. BLACKMAN, JR., ET AL   2,912,825
FLAMEHOLDER WITH BOUNDARY LAYER CONTROL
Filed Feb. 29, 1956

INVENTORS
ARTHUR W. BLACKMAN JR.
EDWARD H. DIAMOND
BY
ATTORNEY

United States Patent Office 2,912,825
Patented Nov. 17, 1959

2,912,825

FLAMEHOLDER WITH BOUNDARY LAYER CONTROL

Arthur W. Blackman, Jr., Manchester, and Edward H. Diamond, Hartford, Conn., assignors to United Aircraft Corporation, East Hartford, Conn., a corporation of Delaware Application February 29, 1956, Serial No. 568,550

1 Claim. (Cl. 60—39.72)

This invention relates to combustion chambers and more particularly to combustion chambers having flameholders located therein.

It is an object of this invention to provide flameholders or flame stabilizers for combustion chambers, afterburners and the like, which flameholders are provided with boundary layer control to improve burning efficiency.

This and other objects of this invention will become readily apparent from the following detailed description of the drawing in which.

In order to increase the efficiency of burning and to increase the blow-out velocity for the combustion chamber it is the purpose of this invention to provide a flameholder with means for increasing the thickness of the boundary layer flow over the flameholder or removing the flameholder boundary layer by suction.

Figure 1:
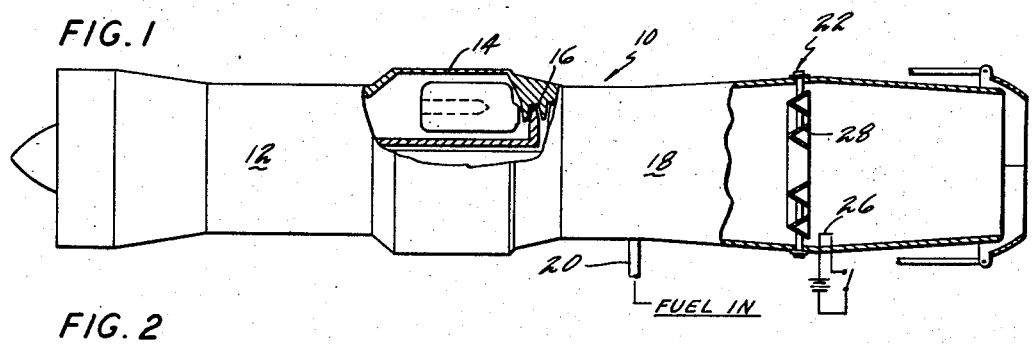
Fig. 1 is a schematic illustration in partial section of a typical turbojet power plant.
Figure 2:
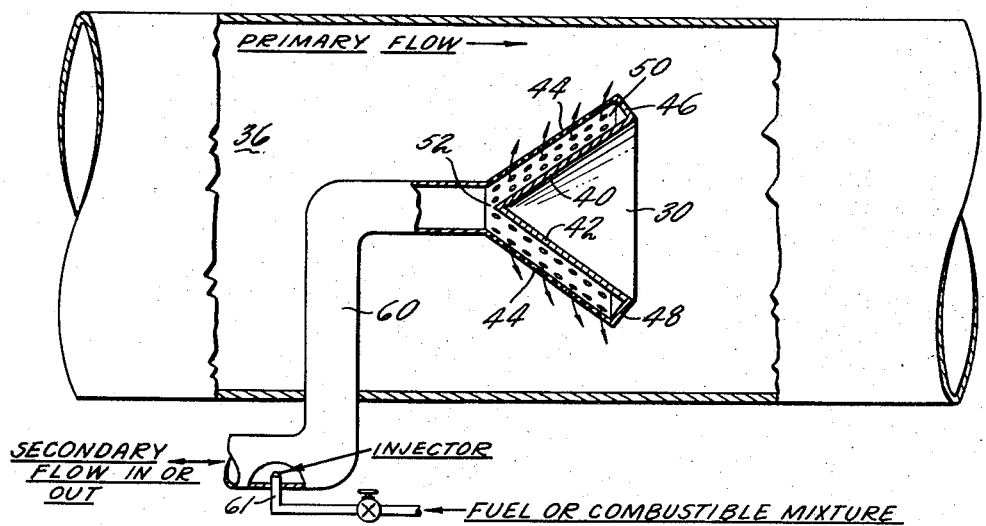
Fig. 2 is an enlarged detail cross-sectional view of a combustion chamber having a flameholder according to this invention.
Figure 3:
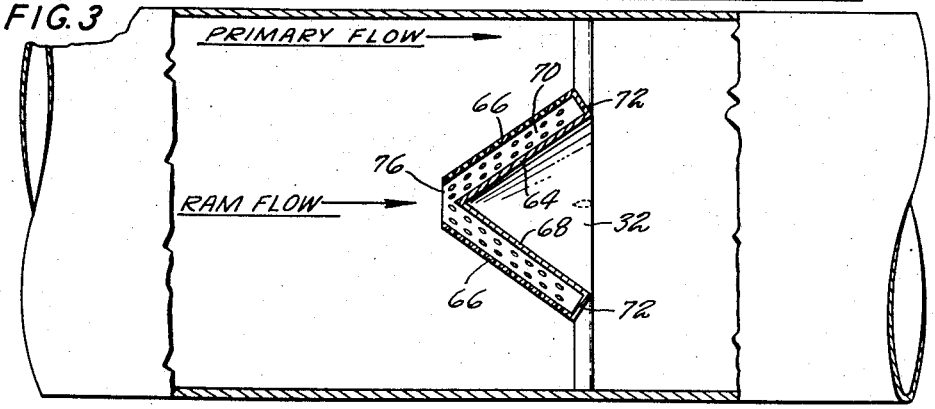
Fig. 3 is a modification of the Fig. 2 construction.

Referring to Fig. 1, a turbojet power plant is generally indicated at 10 as having a compressor section 12, a combustion section 14, a turbine section 16 for driving the compressor and an afterburner section 18. The afterburner 18 may have fuel injected by suitable means via a pipe 20. A flameholder section 22 is also provided as well as some form of ignition such as, for example, the spark gap schematically illustrated at 26. The flameholder section 22 comprises members which are substantially V shaped in cross section and these may be in the form of annular rings 28 as shown in Fig. 1 or they may take the shape of cones 30 and 32 as shown in Figs. 2 and 3. The flameholders may also be in the shape of transverse bars running perpendicular to the axis of flow through the combustion chamber or afterburner.

As better seen in Fig. 2, an afterburner or combustion chamber 36 is shown as having a conical type flameholder 30 located therein. The flameholder 30 in cross section comprises walls 40 and 42 which diverge in a donwstream direction. One or more perforated walls 44 are provided which walls are radially spaced outwardly from the walls 40 and 42 away from the longitudinal axis of the duct. The walls 40 and 42 at their downstream ends include flange like members 46 and 48 which together with the walls 44 form a chamber 50. The chamber 50 has an opening 52 adjacent the upstream end of the walls 40, 42 and 44 for receiving fluid. This fluid in desirable portions is blown through the perforations of the walls 44 such that a thickened turbulent boundary layer is created on the outside of the perforated walls 44. This thickened boundary layer in turn provides better burning efficiency and a higher blow-out velocity for the burner.

Alternately, fluid can be removed from the flameholder boundary layer through the perforations of the walls 44 such that a laminar boundary layer exists on the flameholder. This laminar boundary layer also results in a higher blow-out velocity for the burner.

It should be noted that although the flameholder 30 of Fig. 2 is conical and hence has a continuous wall, the flameholder may take the shape of a transverse bar, but in either instance the flameholders will provide wall portions which diverge in a downstream direction.

Fluid may be fed to the opening 52 by means of a secondary flow pipe 60. As described, a secondary flow may comprise compressor bleed air, a combustible mixture, or such products such as hydrogen may be injected through the injector 61 mounted on the flow pipe 60 in the desired quantities to provide the desired results.

As shown in Fig. 3, a flameholder 32 is illustrated as having diverging walls 64 and 68 which cooperate with the perforated walls 66 to form a chamber 70 therebetween. The chamber 70 is closed at its downstream end by a flange or flanges 72 and has an opening 76 adjacent the upstream end of the walls 64, 66 and 68. The opening 76 may be exposed to the primary flow through the combustion chamber 78 such that a certain amount of ram flow enters the chamber 72. This flow then passes through the perforations of the walls 66 to cause the boundary layer on the outer side thereof to be increased in thickness to provide the improved results.

As a result of this invention, it is apparent that a highly efficient type of flameholder mechanism has been provided. Furthermore, with the mechanism of this invention it may be possible to reduce the size of the flameholder while maintaining the same blow-out limits thereby reducing the drag, for example, in an afterburner when it is not in use.

Although several embodiments of this invention have been illustrated and described herein, it will be apparent that various changes and modifications may be made in the construction and arrangement of the various parts without departing from the scope of this novel concept.

We claim:

In a duct having a fluid flowing therethrough, a conical flameholder body supported centrally of said duct, said body including a pair of concentric conical inner and outer wall members having a V cross section, said members continuously diverging in a downstream direction and extending substantially the same distance along the axis of fluid flow through the duct, a wall spanning the space between the downstream ends of said members to form a chamber between said members, the outer of said members being perforated substantially throughout its entire surface, the inner of said members being imperforate and forming a closure at the apex of its V and forming a flow stagnation area immediately downstream thereof, an opening in the upstream apex end of said outer member communicating with said chamber for conducting fuel and an oxidizer into said opening for subsequent flow into said chamber and out through the perforations of said outer member to control the boundary layer on substantially the entire outer surface of said outer member, and means for regulating the amount of fuel to said chamber.

References Cited in the file of this patent

UNITED STATES PATENTS

| 2,589,945 | Leduc | Mar. 18, 1952 |
| 2,693,083 | Abbott | Nov. 2, 1954 |

FOREIGN PATENTS

| 165,939 | Australia | Nov. 8, 1955 |
| 203,137 | Australia | Aug. 31, 1956 |
| 1,085,458 | France | July 28, 1954 |
| 439,805 | Great Britain | Dec. 6, 1935 |
| 713,265 | Great Britain | Aug. 11, 1954 |